United States Patent
Voigt et al.

[11] Patent Number: 5,887,821
[45] Date of Patent: Mar. 30, 1999

[54] MECHANISM FOR THRUST VECTOR CONTROL USING MULTIPLE NOZZLES AND ONLY TWO YOKE PLATES

[75] Inventors: Allan A. Voigt, Geyserville; Richard W. Schroeder, Santa Rosa; Che-Ram S. Voigt; John M. Speicher, both of Geyserville, all of Calif.

[73] Assignee: Versatron Corporation, Healdsburg, Calif.

[21] Appl. No.: 859,917

[22] Filed: May 21, 1997

[51] Int. Cl.$^6$ .................................................. B64C 15/02
[52] U.S. Cl. ...................... 244/52; 244/3.27; 239/265.35; 60/232
[58] Field of Search .......................... 244/57, 3.22, 169, 244/3.23, 3.24, 3.29, 73 R, 76 J; 239/265.31; 60/232

[56] References Cited

U.S. PATENT DOCUMENTS

| | | |
|---|---|---|
| 3,200,586 | 8/1965 | Ernest . |
| 3,200,587 | 8/1965 | Tolson . |
| 3,786,993 | 1/1974 | Burgess et al. . |
| 3,986,683 | 10/1976 | Ellison . |
| 4,163,534 | 8/1979 | Seeger ........................ 244/52 |
| 4,432,512 | 2/1984 | Young ........................ 244/52 |
| 4,892,253 | 1/1990 | Speicher et al. . |
| 5,505,408 | 4/1996 | Speicher et al. . |

Primary Examiner—Galen L. Barefoot
Attorney, Agent, or Firm—Henry M. Bissell

[57] ABSTRACT

In a missile thrust vector control (TVC) system, two yoke plates are used which surround a pair of pivotably-mounted rocket nozzles. The rocket nozzles pass through corresponding elongated slots disposed on each yoke plate, the elongate slots engaging said rocket nozzles and operating to actuate the movement of the rocket nozzles in accordance with command signals issued by the missile autopilot. The actuator yoke plates are mounted for movement in orthogonal directions, and for rotation in unison. The orthogonal movement of the yoke plates effects corresponding movement of the rocket nozzles in the yaw and pitch directions. Simultaneous rotation of the yoke plates produces a relative twisting of the pivotably-mounted rocket nozzles causing thrust angles to deviate from the missile central axis in opposite directions but equal degree, thereby imparting a roll moment to the missile. In this fashion, any combination of movements of the missile during flight is made possible.

3 Claims, 6 Drawing Sheets

ID = "N" />

MECHANISM FOR THRUST VECTOR CONTROL USING MULTIPLE NOZZLES AND ONLY TWO YOKE PLATES

BACKGROUND OF THE INVENTION

1. Field of the Invention

This invention relates to the steering control of rocket propelled vehicles by the use of thrust direction control or a combination of thrust direction control and steering fin control.

2. Description of the Related Art

As military aircraft become faster and more maneuverable, there is an increased need for faster and more maneuverable missiles with longer ranges to counter these threats. One method of increasing maneuverability of a missile is to use a steerable nozzle on the rocket motor to allow the direction of thrust to he controlled. This thrust vector control (TVC) affords greater maneuverability than traditional movable aerodynamic fins alone can provide under low speed or very high altitude where dynamic pressure is low.

The mechanism used to move the steerable nozzle is known as the nozzle actuator system. Such a system is disclosed in U.S. Pat. Nos. 5,505,408 of John M. Speicher, Allan A. Voigt and Che-Ram S. Voigt and 4,892,253 of John M. Speicher and Allan A. Voigt, both assigned to the same assignee as the instant application. The disclosures of those patents, incorporated herein by reference, are directed to a pair of orthogonal yoke plates used to actuate a rocket nozzle in accordance with steering commands of the missile control system. The yoke plates are coupled to the rocket nozzle, which is pivoted for movement at a ball-and-socket type joint, such that their translation in their prescribed planes moves the rocket nozzle to effect directional control of the rocket thrust.

A shortcoming of the prior art is that, although thrust direction control may provide adequate control of the missile along the yaw and pitch axes, motion along the roll axis must still be effected through the use of the missile aerofins. A problem arises at high altitudes, however, or under other such conditions of loss dynamic pressure, such as high angles of attack and low speeds, which significantly reduce the effectiveness of the aerofins. This reduces roll motion control and compromises the stability and maneuverability of the missile.

Attempts to obviate problems with reliance on aerofins for roll motion control have included the use of a plurality of rocket nozzles. Such a system is disclosed in U.S. Pat. Nos. 3,200,586 to Ernest. The need to independently control the rocket nozzles in such a system, however, detracts from its practicability by adding additional weight and cost and reducing the reliability of the rocket.

Other systems, such as those disclosed in U.S. Pat. No. 3,786,993 to Burgess et al. and U.S. Pat. No. 3,986,683 to Ellison, have used a single nozzle in conjunction with movable tabs disposed in the exhaust stream. However, in addition to increasing costs, these systems also introduce drag, which results in a host of attendant complications.

U.S. Pat. No. 3,200,587 to Tolson discloses still another system which provides attitude control of a rocket vehicle by shifting the nozzle transversely so that the thrust axis is no longer coincident with the central axis of the vehicle, thereby developing steering torque.

Another attempt to solve the problems of the prior art is disclosed in U.S. Pat. No. 5,662,290, application Ser. No. 08/679,849, of Che-Ram S. Voigt assigned to the same assignee as the instant invention, and incorporated herein by reference. The system of this patent employs a combination of missile fin control and directional nozzle control to effect motion in the yaw, pitch, and roll directions. The missile fin actuation mechanism is mechanically linked to the nozzle control mechanism, the nozzle control mechanism comprising of a pair of orthogonally-mounted yoke plates in which is mounted an interface yoke plate which operates to effect motion of a plurality of rocket nozzles controlled by pairs. The interface yoke plate, however, is an additional moving component which increases the complexity and weight of the nozzle actuation device and which occupies valuable space within the missile.

SUMMARY OF THE INVENTION

In brief, one particular arrangement in accordance with the present invention resolves the deficiencies of the prior art by providing a simple mechanism for thrust direction control of multiple rocket nozzles. The invention eliminates the use of the interface yoke plate, reducing overall system cost, weight and susceptibility to mechanical failure. Spatial advantages are gained because the nozzles do not have to be in the same plane as the fins and because the elimination of the interface yoke plate increases the volume available for packaging of the nozzles. Moreover, the system allows maximum room for pitch and yaw deflection of the nozzles while the aerofins are in the "X" orientation. The particular shape of the actuator yoke plates according to the invention allows for the relative twisting of the pivoted rocket nozzles, a feature absent from prior art that did not employ an interface yoke plate. The significance of the relative twisting is its generation of a roll moment which imparts roll motion to the missile during flight. It is to be understood that the thrust direction control of the invention can be used in lieu of, or in conjunction with, aerofins to effect steering of the missile.

The actuator yoke plates are shaped so as to have a longitudinal slot corresponding to each rocket nozzle passing therethrough. The mounting of the two actuator yoke plates is such that they are rotated from each other by 900, thereby disposing their elongate slots orthogonally to one another.

Motion of the first and second actuator yoke plates effected through a pair of rack and pinion gear assemblies disposed at peripheral ends of each actuator yoke plate. The rack of each assembly is mounted on a carrier which translates along a circumferential path with rotation of the pinion gear, which is controlled by motion commands issued by the missile autopilot.

As the carriers translate, the actuator yoke plates, to which they are slidably engaged, are moved in their mounting planes. This motion, depending on which carrier is moved and in which direction, results in any of a combination of movements of the actuator yoke plates and an attendant movement and orientation of the rocket nozzles.

According to the invention, thrust in the yaw direction is achieved by displacing the nozzles along the missile yaw axis. Similarly, thrust in the pitch direction is accomplished by displacing the nozzles along the pitch axis.

To effect roll motion of the missile, the two actuator yoke plates are rotated in unison. This rotation causes a relative twisting of the pivoted rocket nozzles, directing their exhaust streams in directions transverse to the missile axis, thereby imparting a roll moment to the missile.

DESCRIPTION OF THE DRAWINGS

A better understanding of the present invention may be realized from a consideration of the following detailed description, taken in conjunction with the accompanying drawings, in which.

DETAILED DESCRIPTION OF THE PREFERRED EMBODIMENTS

Figure 6:
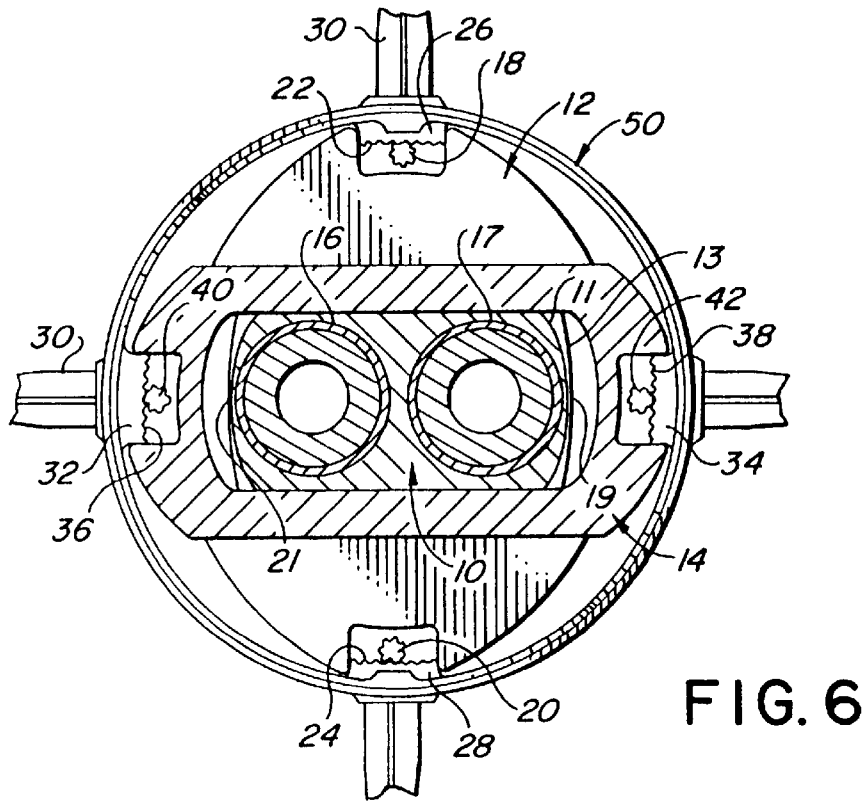
FIG. 6 is a schematic sectional view of the control system of the above-referenced Voigt U.S. Pat. No. 5,642,290 as depicted in FIG. 1 of the patent.
Figure 7:
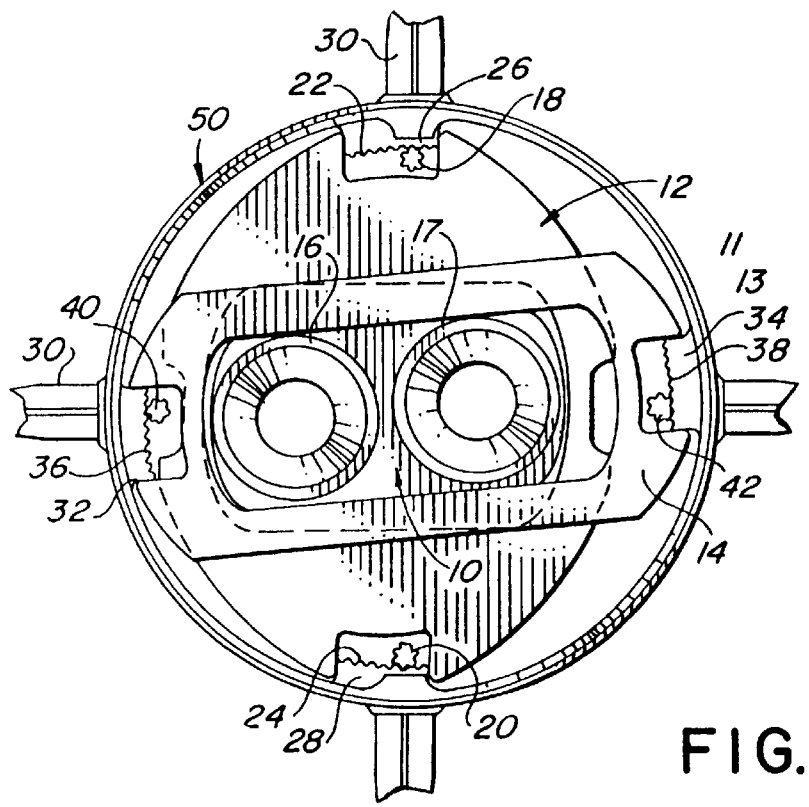
FIG. 7 is a schematic view of the arrangement of FIG. 6, showing displacement of the actuator yoke plates to develop a rotational motion juxtaposed on a yaw axis motion of the interface yoke plate.

FIGS. 1 through 5 are taken from the aforementioned U.S. Pat. No. 5,505,408 of Speicher et al. FIGS. 6 and 7 are from copending application Ser. No. 08/679,849, now U.S. Pat. No. 5,662.290. These views are included to illustrate the background and general layout of arrangements similar to those of the present invention.

Figure 1:
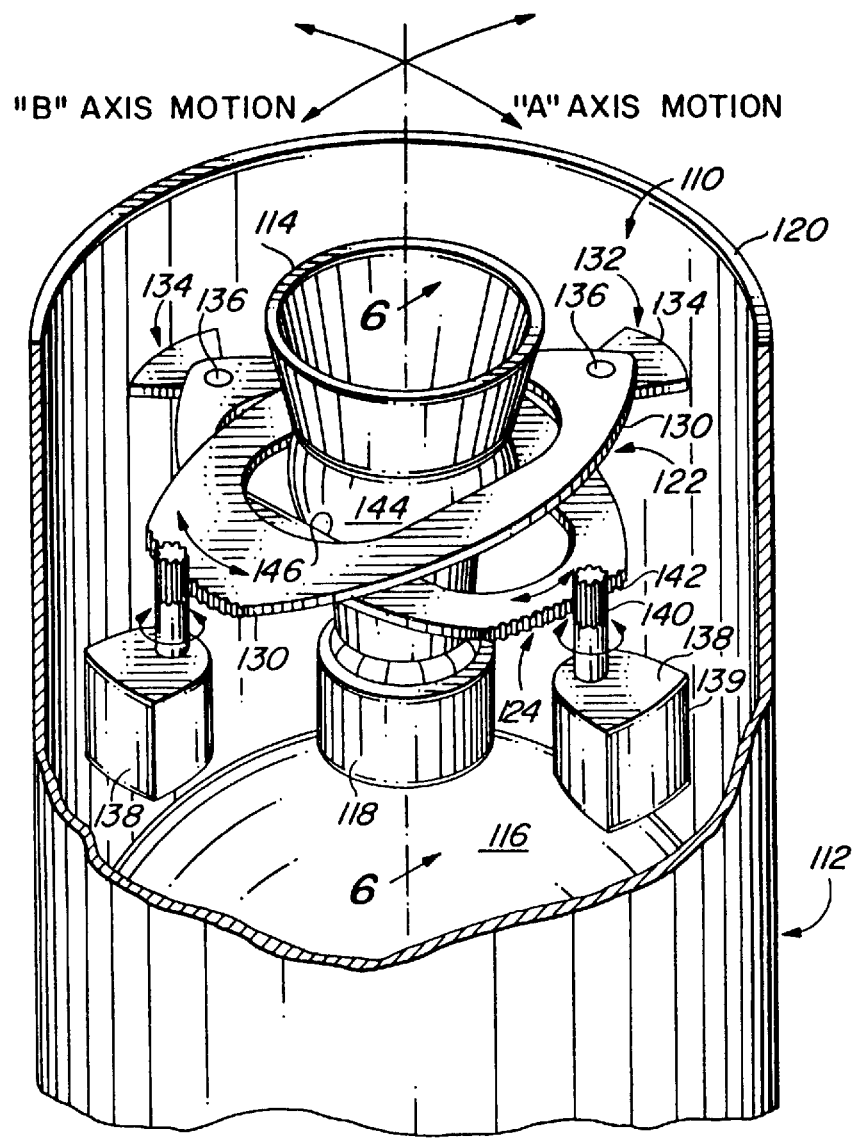
FIG. 1 is a schematic perspective view, partially broken away, illustrating one particular prior art arrangement.

As shown particularly in the schematic view of the prior art arrangement of FIG. 1, the nozzle actuation system 110 is shown in conjunction with a missile 112 having a steerable nozzle 114 mounted to a rocket motor 116 via a ball and socket joint 118, and an encompassing skin 120 which is partially broken away to show details of the steering arrangement therein. The nozzle actuation system 110 comprises a pair of nozzle actuators 122, 124 which are oriented orthogonally from each other in adjacent planes which are generally transverse to the missile central axis to effect steering of the nozzle 114 relative to two orthogonal "A" and "B" axes, respectively. Thus, the actuator system 110 is able to drive the nozzle 114 about the two orthogonal axes A and B for omni-directional steering.

Each of the individual actuators 122, 124 includes a yoke plate 130 and anchoring means at opposite ends of the yoke plate for anchoring the actuator to the missile skin 120. At one end of each yoke plate 130, the anchoring assembly 132 comprises an anchor 134 which is affixed to the inner surface of the skin 120 and serves as a pivot mount for the yoke plate 130 via a pivot pin 136.

At the opposite end of each yoke plate 130, the anchoring arrangement comprises a gear motor 138 contained in a housing 139 which is affixed to the inner surface of the skin 120. Projecting from the housing 139 is a shaft gear 140 which is adapted to engage the adjacent end of the yoke 130 which is fashioned with gear teeth comprising part of a sector gear 142.

Completing the actuation system 110 of FIG. 1 is a yoke seat 144 which is mounted circumferentially about the nozzle 114 within the openings of the elongated yoke plates 130. The yoke seat 144 is formed as a segment of a sphere to provide sliding contact points, such as at 146, to support the bearing loads generated by the yoke plates 130. The seat 144 is spherically cut and has a center on the nozzle center line at a point approximately in line with the central plane between the two yoke plates 130.

Each yoke plate has an elongated central opening defined by two arms which extend about the nozzle. These arms have bearing surfaces adjacent the nozzle yoke seat for transmitting lateral forces to the nozzle 114 while permitting sliding contact with the yoke seat 144.

Figure 2:
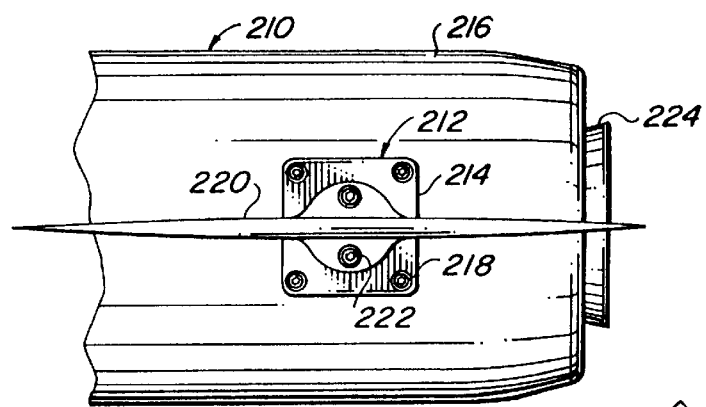
FIG. 2 is a schematic view showing the mounting of a single aerofin on a missile housing.

FIG. 2 is a schematic diagram representing a missile 210 with an aerofin assembly 212 installed thereon. The assembly 212 comprises an aerofin 220 pivotably installed on a base plate 214 which is secured to the skin 216 of the missile 210 by means of mounting bolts 218. The aerofin 220 is affixed to an internal drive mechanism by mounting bolts 222. The exhaust nozzle of the missile 210 is represented schematically at 224. The pivotable mounting of the nozzle 224 corresponds to that which is shown in FIG. 1.

Figure 3:
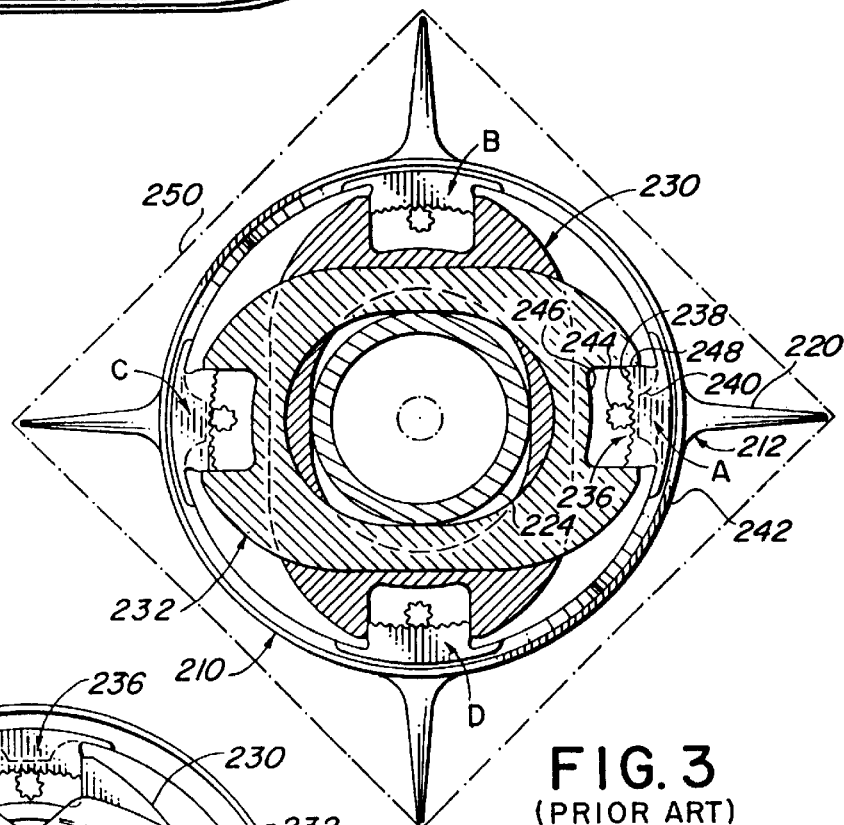
FIG. 3 is a schematic cross-sectional view showing the general orientation of aerofins and yoke plates in a typical prior art arrangement.
Figure 4:
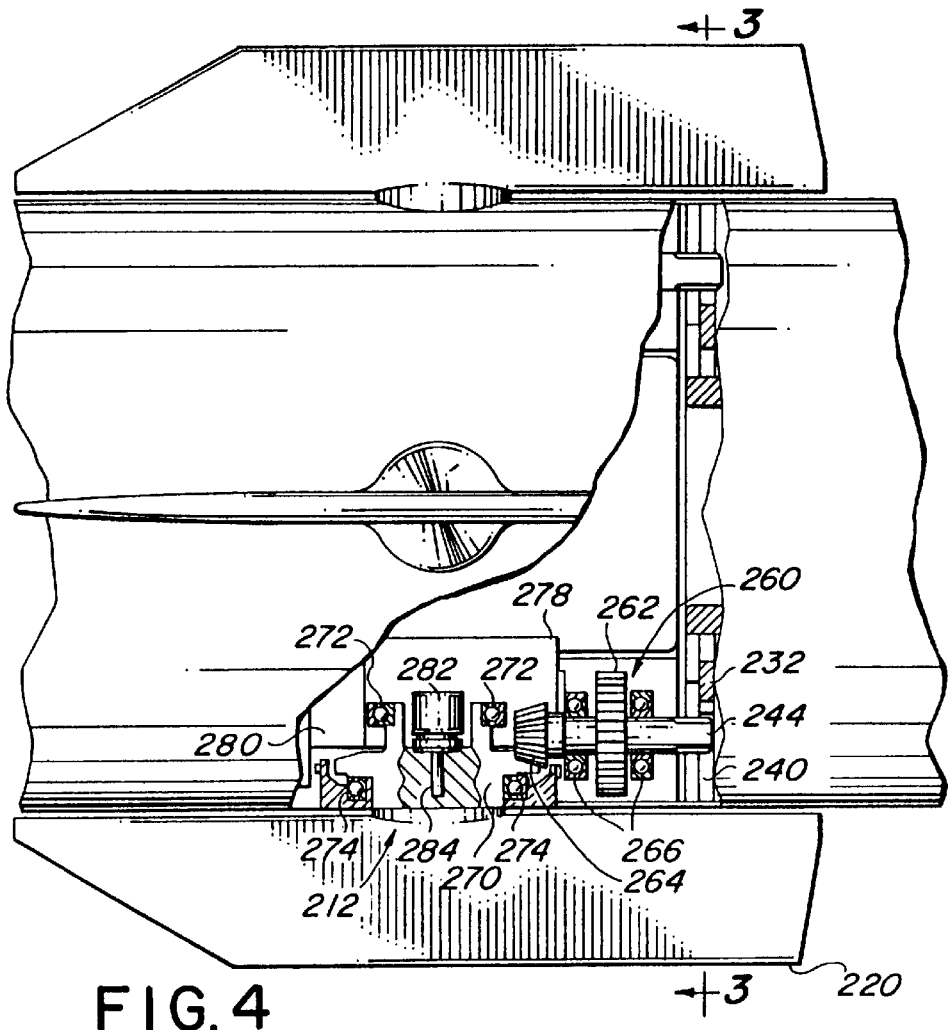
FIG. 4 is a schematic side view, partially broken away, showing some of the details of the internal drive mechanism employed in arrangements such as FIG. 3.

FIG. 3 is a schematic diagram illustrating the drive elements of the combination steering control system 200 and corresponds to a sectional view taken along the line 3—3 in FIG. 4, looking in the direction of the arrows. A pair of orthogonally oriented yoke plates 230, 232 are shown bearing against the steerable nozzle 224 to control thrust direction in a manner similar to that of the prior art arrangement depicted in FIG. 1. A principal difference from that device is that each of the yoke plates 230, 232 is free to move in response to rotational forces applied at both opposite ends thereof, rather than being pivotably anchored at one end as indicated in FIG. 1.

The details of the yoke plate drive assemblies are shown for the unit A at the position of the aerofin assembly 212. A rack and pinion gear assembly 236 comprises a curved rack gear 238 on a rack carrier 240. The carrier 240 is curved on its outer surface to match the curvature of the missile shell 242 and is adapted to slide circumferentially relative to the missile shell 242 as it is driven by the spur gear 244. The corresponding end of the yoke plate 232 is provided with a U-shaped recess 246 in which the rack carrier 240 is mounted, bearing against side walls 248 of the recess 246. This arrangement is repeated at the other three aerofin stations B, C and D located at 90° spacings about the missile.

In FIG. 3, the broken line outline 250 indicates the typical launcher envelope for such a system. It will be apparent that, as the pinion gear 244 is driven to rotate, it moves the rack carrier 240 either clockwise or counterclockwise, depending upon the direction of rotation of the pinion gear 244. Corresponding movement of the yoke plate 232 moves the nozzle 224 off axis, thereby changing the direction of the thrust to effect steering of the missile.

FIG. 4 illustrates schematically the details of the combination drive arrangement for an aerofin 212 and a yoke plate 262 for the prior art apparatus of FIG. 3. This view shows the combined aerofin and TVC dual pinion gear 260 having a central drive gear 242 mounted on a common shaft with spur gear 244 and a bevel pinion gear 264. The shaft of the dual pinion gear 260 is mounted in bearings 266.

A bevel gear 270 is directly connected to the aerofin 220 and is coupled to the bevel pinion gear 264. Gear 270 is mounted for rotation in upper and lower bearings 272, 274. An electric motor 280 has an output shaft coupled to drive the gear 262 which in turn produces rotation of both the bevel gear 270 and the pinion gear 244, thus driving both the aerofin 220 and the rack 240. This in turn drives the yoke plate 232. A feedback transducer 282 is connected to the aerofin bevel gear 270 by a shaft 284, thereby providing aerofin position data for the control system of the drive arrangement 200. The coupling between the motor 280 and the gear 262 is represented by the block 278. This preferably incorporates a speed reducing gear train to transform the motor's relatively high speed and low torque into low speed and high torque. Such speed reducers are known in the art; details are omitted from FIG. 4 for simplicity.

Figure 5A:
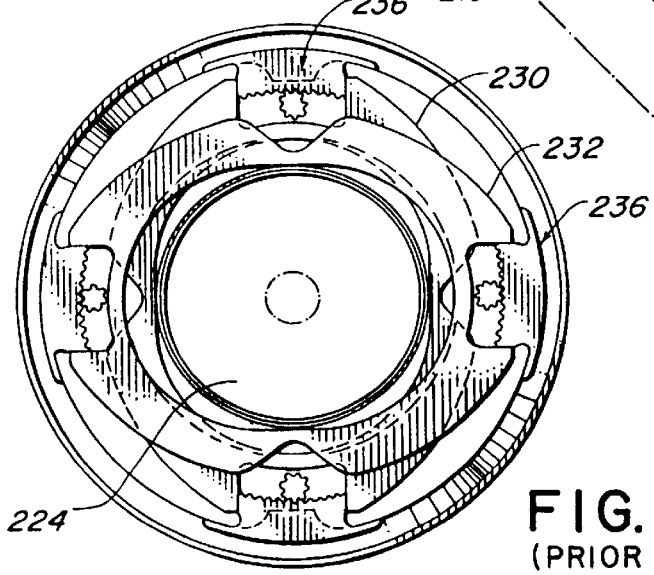
FIGS. 5A and 5B are schematic end views depicting the orientation of the yoke plates of FIG. 3 to different positions of the associated drive gears.
Figure 5B:
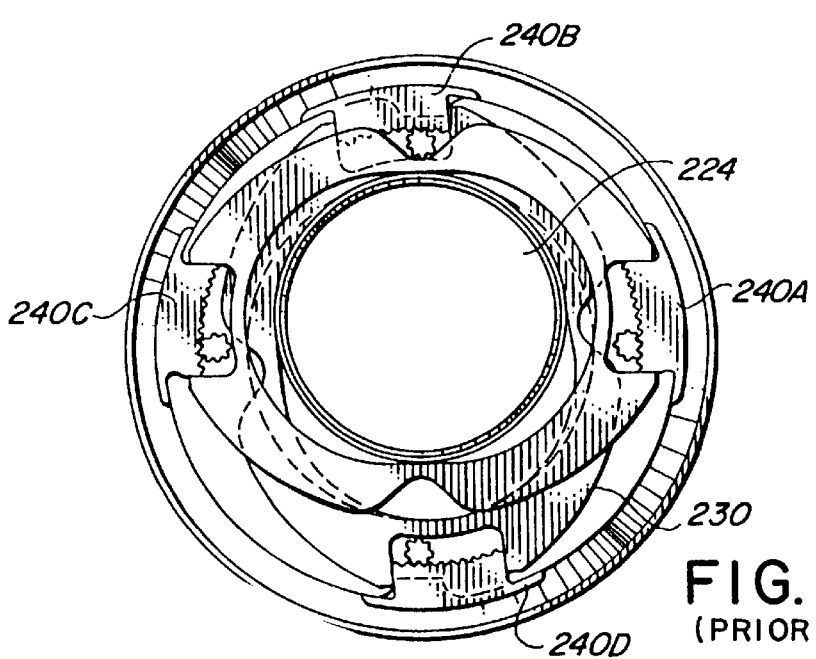

FIG. 5A is a schematic diagram, like that of FIG. 3, showing the rack and pinion drive arrangement and the corresponding yoke plates 230, 232 with nozzle 224 in neutral position. FIG. 5B is a similar view showing the racks driven to their extreme positions. Rack carriers 240A and 240C have been driven upward, thereby directing the nozzle 224 off axis to an upper position. similarly, the aerofins 220 at positions A and C (see FIG. 3) would be rotated correspondingly to drive the missile in the same direction of flight as results from the shifting of the nozzle 224. The rack carriers 240B, 240D, however, are shown driven in opposite directions from each other; that is, the rack carrier 240B is driven to the left while 240D is driven to the right. This condition corresponds to the rotation of the aerofins at stations B and D (FIG. 3) in opposite directions, which would produce a roll motion of the missile. Moving the corresponding rack carriers 240B and 240D as shown results in the nozzle 224 being unaffected, since the yoke plate 230 does not move off axis as the rack carriers 240B and 240D are moved; the yoke plate 230 merely rotates with the rack carriers 240B, 240D. Thus, missile roll maneuvers can be effected without shifting the nozzle off center. However, when the aerofins are driven to change the direction of the missile relative to its flight trajectory, the depicted arrangement also produces a corresponding shift of the nozzle direction to direct the thrust in accordance with the shift of the aerofins.

FIGS. 6 and 7 show one particular nozzle actuator system of a missile 50 which uses an interface yoke plate 10. The actuator system has a first actuator yoke plate 12, a second actuator yoke plate 14, and an interface yoke plate 10. Actuator yoke plate 12 is slidably mounted on translating carriers 26 and 28, which carriers are provided with rack gears 22 and 24 engaging pinion gears 18 and 20, respectively. Actuator yoke plate 14 is slidably mounted on translating carriers 32 and 34, which are in turn provided with rack gears 36 and 38 engaging pinion gears 40 and 42, respectively.

Carriers 26, 28, 32, and 34 travel along a circumferential path inside the skin of missile 50 when their associated pinion gears are rotated against the rack gears. Rotation of the pinion gears is carried out in accordance with commands from the missile autopilot during missile flight.

Interface yoke plate 10 is disposed between actuator yoke plates 12 and 14, extending into the openings therein. Translation or rotation of one or both actuator yoke plates 12, 14 is transferred to similar motion of interface yoke plate 10, which operates to move rocket nozzles 16 and 17 accordingly.

To achieve thrust in the yaw direction, which is the left-right direction of the drawing figures, pinion gears 18 and 20 are rotated counterclockwise and clockwise, respectively. This causes carriers 26 and 28 to slide to the left, displacing actuator yoke plate 12 to the left. Interface yoke plate 10 is similarly displaced to the left by virtue of its contact with actuator yoke plate 12 eat contact surfaces 19, 21, thereby directing rocket nozzles 16 and 17, which are pivotally mounted at their bases by a ball-and-socket joint as discussed in U.S. Pat. No. 5,505,408, to produce thrust in the yaw direction.

Thrust in the pitch direction, which is the up-down direction of the drawing figures, is accomplished by similar motion in the pitch direction of carriers 32 and 34, actuator yoke plate 14, and interface yoke plate 10.

In order to impart roll motion to missile 50, nozzles 16 and 17 are configured to produce thrust vectors at varying angles relative to the missile axis. This is accomplished by rotating interface yoke plate 10 to thereby produce a relative twist of the pivoted nozzles 16 and 17. For example, counterclockwise rotation of interface yoke plate 10 deflects left nozzle 16 downward and right nozzle 17 upward, resulting in a roll moment on missile 50. FIG. 2 illustrates this rotation, which is juxtaposed on a yaw displacement of the nozzles 16 and 17. Thus both a yaw and roll motion are achieved simultaneously, a particularly advantageous feature in situations of a high attack angle with low dynamic pressure, where missile aerofins are least effective.

Roll motion can also be juxtaposed on pitch motion, with actuator yoke plate 14 acting to displace interface yoke plate 10 in the pitch direction while interface roll plate 10 is rotated.

The rotation of interface roll plate 10 is accomplished through the rotation of yoke plate 14. By turning both pinion gears 40 and 42 in the same direction, carriers 32 and 34 are driven in opposite directions, imparting a rotational motion to actuator yoke plate 14. To facilitate rotation, side edges 11 of interface yoke plate 10 are curved and engage curved interior edges 13 of actuator yoke plate 12. The curvature of edges 11 and 13 is matched so that upon rotation of interface yoke plate 10, edges 11 remain in contact with edges 13. However, the rotational motion of interface yoke plate 10 is decoupled from actuator yoke plate 12, and only the rotation of one actuator yoke plate, actuator yoke plate 14, is required to impart the rotational motion of interface yoke plate 10. In this way, only the translational motion of interface yoke plate 10 is coupled to yoke plate 12, while rotational motion is decoupled therefrom.

Figure 8A:
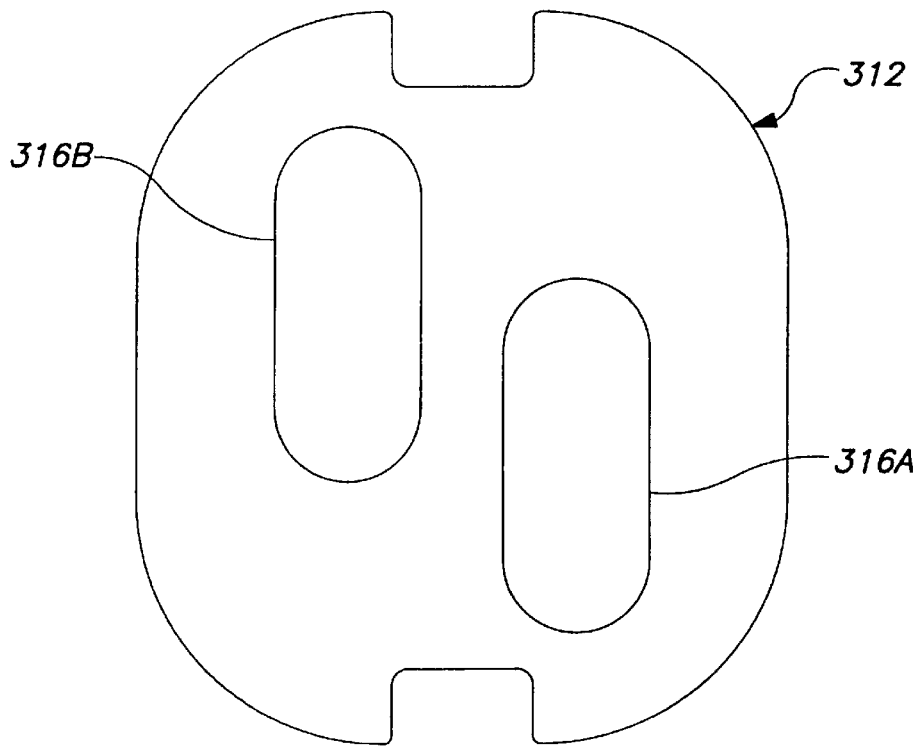
FIGS. 8A and 8B are schematic top views of the two actuator yoke plates of the invention.
Figure 8B:
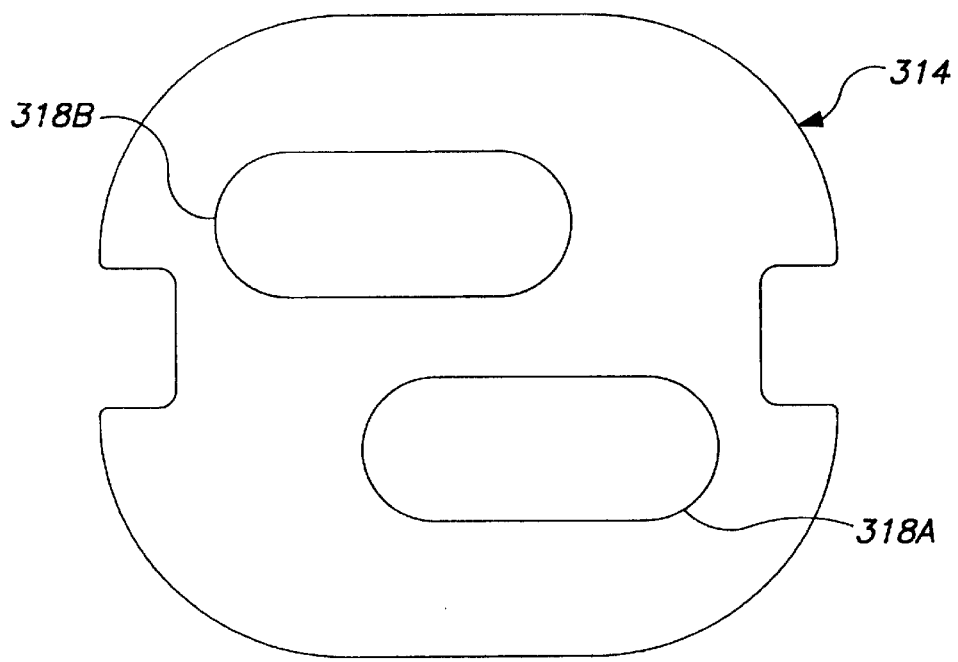
Figure 9:
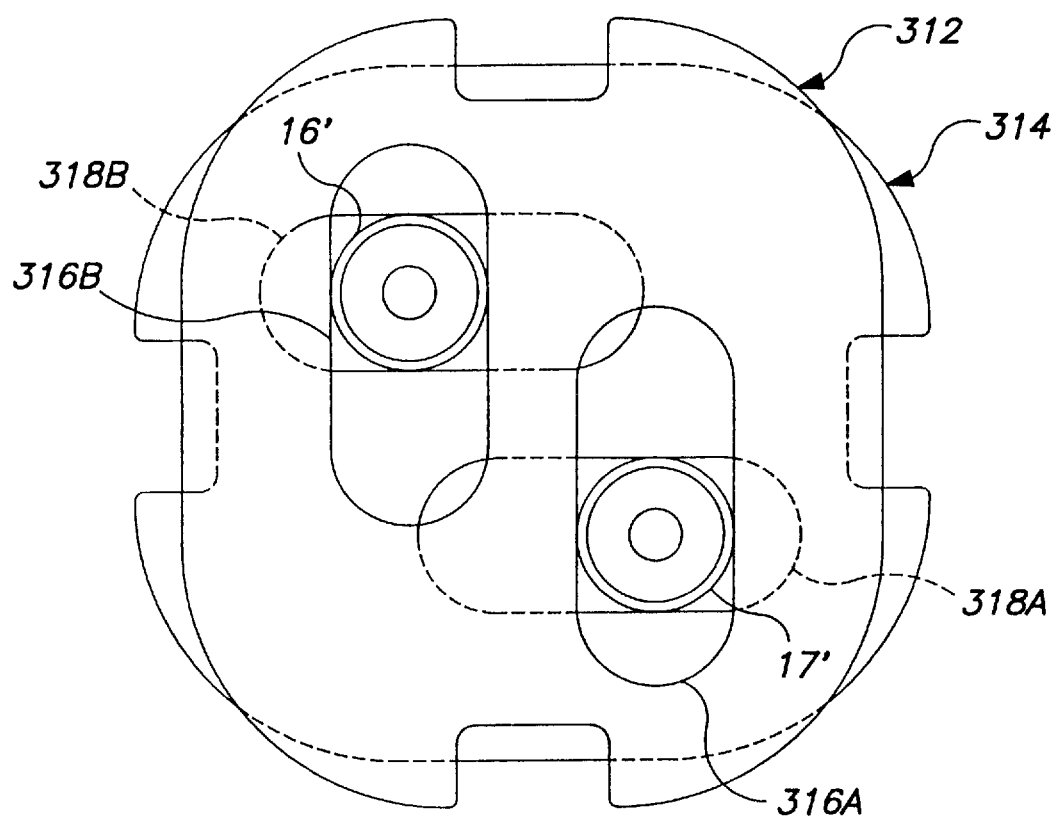
FIG. 9 is a schematic aft view looking forward of the two yoke plates of the invention in the mounted position in the missile, with the rocket nozzles passing therethrough.

FIGS. 8 and 9 show the particular yoke plate arrangement of the present invention. Rather than using an intermediate yoke plate straddled by two actuator yoke plates as in the earlier figures, the arrangement of FIGS. 8 and 9 dispenses with the interface yoke plate and uses a pair of actuator yoke plates 312, 314 having formed therein a pair of parallel elongate slots 316, 318. The elongate slots of each actuator yoke plate are offset from one another, and the two actuator yoke plates are configured so as to be mirror images of each other and rotated 90°. These actuator yoke plates are mounted for translation in the yaw and pitch axes as is known in the art and described above with respect to FIGS. 1–7. Specifically, carriers with associated rack and pinion gear systems are provided at the peripheral ends of each actuator yoke plate 312, 314 to thereby effect translation of the actuator yoke plate in its mounting plane in accordance with command signals issued by the missile autopilot. Each actuator yoke plate is also capable of rotation in its mounting plane by appropriate action of the associated carriers.

The actuator yoke plates 312, 314 are disposed within the missile such that their longitudinal axes are orthogonal to one another. The elongated parallel slots of the yoke plates in this configuration overlap, with the rocket nozzles 16' and 17' passing through the two yoke plates and engaging the internal edges of the parallel elongated slots 316 and 318.

Movement of the actuator yoke plates 312 and 314 along the yaw and pitch axes is accordingly transferred to movement of the pivoted nozzles 16' and 17' along the same axes to thereby effect steering of the missile during flight.

In particular, left-right motion of yoke plate 312, taken to be representative of motion along the yaw axis, forces the translation of the rocket nozzles, which bear against the edges of the elongate slots through which they pass, in the yaw direction. This yaw direction motion of the nozzles is uninhibited by elongate slots 318A and 318B of actuator yoke plate 314 because these slots 318 are disposed along the same direction. Motion of actuator yoke plate 314 in the up-down direction, taken to represent the pitch direction, imparts a motion of the rocket nozzles 16' and 17' in the same direction, with the edges of elongate slots 318A and 318B against which the rocket nozzles bear imparting this motion of the rocket nozzles in the pitch axis. Because elongate slots 316A and 316B of actuator yoke plate 312 are disposed in the same direction as this pitch motion, they do not obstruct the rocket nozzles.

In order to effect a roll motion of the missile, either of the two actuator yoke plates 312, 314 is rotated about the missile center-line. This rotation of the yoke plates, either clockwise or counterclockwise, produces a relative twisting of the pivoted rocket nozzles 16' and 17' via simultaneous operation of the internal edges of the elongated slots against which the rocket nozzles bear. Because of this relative twisting, the thrust axes of the rocket nozzles are caused to deviate from center to an equal but opposite extent, thereby imparting a roll moment to the missile. In this manner, the actuator yoke plates effectively operate to steer the missile in all three axes. It is contemplated by the invention that any combination of these motions can be simultaneously effected. In addition, as is known in the art, the motion of the yoke plates and the whole of the TVC system can be linked to the motion of the aerofins to thereby simultaneously operate fin motion and rocket nozzle motion.

Although there have been described hereinabove various specific arrangements of a mechanism for thrust vector control using multiple nozzles and only two yoke plates in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for orienting a pair of pivotably-mounted nozzles for controlling the motion of a missile in flight about pitch, yaw and roll axes in response to applied command signals, said apparatus comprising:

a first yoke plate disposed in a first plane transverse to the missile axis and mounted for rotation in said first plane and translation in a first direction in said first plane, said first yoke plate having formed therein a first pair of parallel elongate slots disposed transversely to said first direction, said pair of nozzles passing through said first pair of slots for engagement with edges of said first pair of slots;

a second yoke plate disposed in a second plane transverse to the missile axis and mounted for rotation in said second plane and translation in a second direction in said second plane which is orthogonal to said first direction, said second yoke plate having formed therein a second pair of parallel elongate slots disposed transversely to said second direction, said pair of nozzles passing through said second pair of slots for engagement with edges of said second pair of slots;

first mounting means for mounting said first yoke plate for rotation and translation in said first plane in accordance with said command signals; and second mounting means for mounting said second yoke plate for rotation and translation in said second plane in accordance with said command signals.

2. The apparatus of claim 1, wherein said first and second mounting means are mechanically linked to at least one pair of aerofins for movement in conjunction therewith.

3. The apparatus of claim 1, wherein said first mounting means is comprised of first and second rack and pinion gear assemblies, the rack of said first assembly being disposed on a first carrier, the rack of said second assembly being disposed on a second carrier, said first and second carriers being driven to laterally displace said first yoke plate upon activation of at least one of said gear assemblies; and wherein said second mounting means is comprised of third and fourth rack and pinion gear assemblies, the rack of said third assembly being disposed on a third carrier, the rack of said fourth assembly being disposed on a fourth carrier, said third and fourth carriers being driven to laterally displace said second yoke plate upon activation of at least one of said third and fourth gear assemblies.

* * * * *